3,001,962
PROCESS OF PREPARING ALKYD RESINS INVOLVING THE ACIDOLYSIS OF THE TRIGYLCERIDE OILS AND PHTHALIC ANHYDRIDE
Earl F. Carlston, El Cerrito, Calif., assignor to California Research Corporation, San Francisco, Calif., a corporation of Delaware
No Drawing. Filed Sept. 24, 1958, Ser. No. 762,922
2 Claims. (Cl. 260—22)

The present invention relates to the preparation of oil-modified alkyd resins, and more particularly to an improved process of alkyd preparation involving the acidolysis of a triglyceride and phthalic anhydride.

As employed herein, the term "oil-modified alkyd resin" denotes generically polymeric polyesters of polyhydric alcohols having more than two hydroxyl groups, e.g., glycerol, and phthalic anhydride, and in which a portion of the phthalic anhydride is replaced by a fatty acid from vegetable or marine oils, to produce an oil-modified alkyd resin. As is known in the art, oil-modified alkyd resins are made with drying, semi-drying, or nondrying oils.

One way of preparing oil-modified alkyd resins is by the so-called process of "alcoholysis." According to this procedure, the first stage involves heating with catalyst, litharge, or other metallic oxides and hydroxides, the oil-containing monocarboxylic fatty acids in the form of triglycerides with a polyhydric alcohol in order to produce a mixture of partial esters of polyhydric alcohols and monocarboxlic fatty acids. In the second stage this mixture of partial esters is condensed with phthalic anhydride to a substantially completely esterified alkyd resin of low acid number. Resins of varying oil length, i.e., short, medium, long, and very long, can be produced, depending on the relative oil content or oil length calculated as triglyceride in percent by weight of the final resin.

The preparation of alkyd resins as above described has associated therewith certain problems, which, although troublesome, are nevertheless tolerated for lack of a solution therefor. To illustrate, in the preparation of the oil-modified glyceryl phthalate resins, the reaction product of the dibasic phthalic anhydride, trihydric alcohol, glycerol, modified with either a drying or nondrying oil, following the alcoholysis of the triglyceride and polyhydric alcohol, the phthalic anhydride may be added in either of two ways: the resin kettle is opened, and the anhydride added directly to the contents; or anhydride in fluid state may be pumped into the closed kettle. The first alternative, opening of the hot kettle or reactor for the addition of anhydride, gives rise to the issuance of undesirable vapors comprising steam, acrolein, and anhydride, which in addition to creating a fire hazard, are regarded as industrial toxicants. The second alternative of pumping and transmitting molten anhydride involves costly corrosion-resistant equipment. It has accordingly been proposed to vary the sequence of steps involved in the esterification reaction by first reacting the triglyceride with the phthalic anhydride, a procedure known as "acidolysis," followed by the addition of the glycerol. While alcoholysis results in a mixture of partial esters of polyhydric alcohols and monocarboxylic acids, "acidolysis" produces fatty acids and half-esters of the triglyceride oil and the phthalic anhydride. It has been ascertained, however, that the procedure of acidolysis to be successful requires the observance of certain unpredictable requirements regarding both the materials employed and the conditions under which the process is carried out. For example, it has been observed that the simple variation in the order of addition of reactants to the alkyd vessel, i.e., heating to temperature of phthalic anhydride and triglyceride oil, followed by addition of glycerol, a known noncorrosive and easily pumpable material, does not produce desired results, inasmuch as the acidolysis reaction of the phthalic anhydride with the oil does not occur, and the phthalic anhyride and glycerol react to form a gel. Accordingly, an object of the present invention is to provide a process for the acidolysis of triglyceride oil with phthalic anhydride.

The present invention is predicated on the discovery that alkyd resins can be prepared from glycerol, a triglyceride oil, and phthalic anhydride by the procedure of acidolysis employing a temperature capable of being readily attained with the ordinary equipment, i.e., around 465–500° F. by heating a mixture of the triglyceride and phthalic anhydride in the presence of a fatty acid to a temperature within the range 465–500° F., preferably around 480° F., maintaining this temperature during the addition of the glycerol to the aforesaid mixture at a controlled rate to allow acidolysis to proceed simultaneously with esterification, thus avoiding the formation of gels. Since the esterification reaction with subsequent evolution of water is endothermic in nature, care is exercised that the cooling effect due to the addition of the glycerol does not overbalance the input of heat, thereby producing a precipitous drop in temperature and thus preventing acidolysis. Following addition of the glycerol, the whole is then further heated to continue esterification and produce a bright resin of desired acid number, generally below 25, and preferably below 10. Since fatty acids are usually less available and more expensive than glyceride oils, it is generally desirable to employ as much glyceride oil and as little fatty acid as practicable and yet provide a satisfactory acidolysis reaction. Accordingly, I have found that a satisfactory acidolysis reaction can be effected in the presence of a minimum amount of fatty acid expressed by the mole ratio of fatty acid to glyceride oil of about 1:1.

This procedure, which allows acidolysis to occur simultaneously with esterification and also transesterification, eliminates gel formation, because the acidolyzed oil and the liberated fatty acids react with glycerol to form compatible products in contrast to the incompatible triglyceride oil and gelable glycerol phthalate mixture.

The following examples are given to illustrate the invention, but are not to be construed as limiting the invention thereto.

*Example 1*

A mixture of 1043 g. (1.18 mole) safflower oil, and 829 g. (5.60 mole) phthalic anhydride, and 338 g. (1.18 mole) of fractionated tall oil acids is heated to 480° F. To the heated mixture there is added 451 g. (4.90 mole) glycerol (anhydrous basis) over a period of 40 minutes, the temperature being maintained at 480° F. during the addition of the glycerol. Following the addition of glycerine, the mixture is heated at 480° F. for an additional 1¾ hr. The resulting resin is clear and bright.

*Example 2*

A mixture of 1043 (1.18 mole) safflower oil and 829 g. (5.61 mole) phthalic anhydride, and 338 g. (1.18 mole) of fractionated tall oil acids is heated to a temperature of 465° F. whereupon 451 g. (490 mole) of glycerol (anhydrous basis) is added over a period of 1½ hr., while maintaining the temperature at about 465° F. for a total cooking time at 465° F. of 3 hrs. The resulting resin is clear and bright.

*Example 3*

A mixture of 1100 g. (1.24 mole) safflower oil and 823 g. (5.56 mole) phthalic anhydride, and 263 g. (0.92 mole) fractionated tall oil acids is heated to 480° F., and 429 g. (4.66 mole) glycerol (anhydrous basis) is then added at 480° F. to the mixture over a period of time of 1 hr., and heating continued, all at 480° F., for an additional 1⅓ hr. The resin contains a slight amount of finely divided glyceryl phthalate gel lumps, thus showing the effect of lowering the fatty acid content.

*Example 4*

A mixture of 1179 g. (1.34 mole) safflower oil, and 840 g. (4.80 mole) phthalic anhydride, and 187 g. (0.66 mole) of fractionated tall oil fatty acids is heated to 480° F., and 405 g. (4.40 mole) glycerol (anhydrous basis) is then added at 480° F. to the mixture over a period of 66 minutes, and heating continued, all at 480° F., for an additional hour. Considerable glyceryl phthalate gel lumps are formed, showing the effect of further lowering the fatty acid content.

In preparing the resins of the invention, it is advantageous to employ sufficient glycerol to react with all of the fatty acid, together with an excess of glycerol of 10 to 25% over and above that required stoichiometrically to react with the phthalic anhydride. In other words, for each equivalent of phthalic anhydride there can be employed 1.1 to 1.25 equivalents of glycerol, this being an amount of glycerol above that required to react with the added fatty acid content. By then varying the amounts of fatty acid and triglyceride employed in the acidolysis reaction, the oil length of the resin, defined as the percent by weight of the glyceride content based on total resin weight, resins having an oil length within the range of about 20% to 90% can be obtained.

The whole operation of heating the mixture of phthalic anhydride, fatty acid, and triglyceride oil followed by slow addition of glycerol to obtain simultaneous acidolysis and esterification can be effected in conventional cooking vessels or kettles of any suitable size, equipped with adequate heating and stirring means, openings for charging the ingredients, sampling the product and, if it is desired, to exclude oxidative effects of the air, provided with inlets and outlets for the passage of an inert gas. Following the addition of the glycerol, cooking is continued to a point until a resin of the desired acid number is achieved. In general, a resin of low acid number is desirable, and resins of acid numbers below 25, and preferably below 10, are highly desirable.

While the invention has been exemplified in terms of the specific materials employed, other equivalent materials may replace these in part or in whole. Thus, the glycerine may be replaced in whole or in part by other polyhydric alcohols, including glycols such as ethylene glycol, diethylene glycol, triethylene glycol, propylene glycol; and polyols, such as trimethylolpropane, pentaerythritol, dipentaerythritol, mannitol, sorbitol, and the like.

The glyceride employed in the acidolysis reaction may be derived from various sources, and include those of marine and vegetable origin. They may be of nondrying, semidrying, or drying oil type. Thus, in addition to the safflower and linseed oils employed in the examples, there may be mentioned such oils as castor, corn, cocoanut, cottonseed, oiticica, perilla, rapeseed, poppyseed, sunflower, tall oil, tung, and the marine oils, herring, menhaden, and sardine.

The fatty acid employed in the acidolysis reaction can be acids derived from the hydrolysis or saponification of the foregoing glycerides, and include caproic, caprylic, capric, lauric, myristic, palmitic, stearic, arachidic, behemic, oleic, ricinoleic, tall oil fatty acids, linoleic, linolenic, and licanic.

In proceeding as above described gelation during reaction is inhibited or prevented, whereby acidolysis and esterification reactions are permitted to go to completion smoothly and in the shortest time. In addition, clear and bright solutions are produced at the end as compared with the hazy or cloudy solutions obtained by alcoholysis. In the alcoholysis procedure, the resin solutions are cloudy or hazy because of catalyst residues, and require pressure filtration to produce bright and clear solutions. In contrast thereto, filtration is not required in the instant process.

I claim:

1. Process for the preparation of an oil-modified alkyd resin which comprises heating to a temperature within about the range 465° F. to 500° F. a mixture of a triglyceride oil, phthalic anhydride, and at least 1 mol, but below 3 mols, of a fatty acid per mol of the triglyceride oil, said fatty acid having 8 to 22 carbon atoms in the molecule, then adding, while maintaining the above-specified temperature, a saturated aliphatic polyhydric alcohol to the heated mixture slowly and continuously to avoid incompatible gel formation, and then continuing the heating to effect esterification and to produce a resin having an acid number below 25, the polyhydric alcohol being present in an amount sufficient to react with all of the carboxyl groups and the phthalic anhydride up to a 25% stoichiometric excess over the phthalic anhydride, the triglyceride being present in an amount, based on total resin weight, within the range 20% to 90%.

2. Process according to claim 1 wherein the polyhydric alcohol is glycerine.

References Cited in the file of this patent

UNITED STATES PATENTS

| | | |
|---|---|---|
| 1,888,849 | Dawson | Nov. 22, 1932 |
| 2,884,390 | Carmody | Apr. 28, 1959 |

OTHER REFERENCES

Ellis: The Chemistry of Synthetic Resins, pp. 921 and 930, vol. II, published 1935, Reinhold Publishing Corporation, New York, N.Y.